(12) United States Patent
Gong et al.

(10) Patent No.: US 9,407,342 B2
(45) Date of Patent: Aug. 2, 2016

(54) PROTOCOL FOR MU MIMO OPERATION IN A WIRELESS NETWORK

(75) Inventors: Michelle G. Gong, Sunnyvale, CA (US); Dmitry Akhmetov, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 104 days.

(21) Appl. No.: 13/820,957

(22) PCT Filed: Feb. 11, 2011

(86) PCT No.: PCT/US2011/024423
§ 371 (c)(1),
(2), (4) Date: Mar. 5, 2013

(87) PCT Pub. No.: WO2012/039783
PCT Pub. Date: Mar. 29, 2012

(65) Prior Publication Data
US 2013/0170427 A1    Jul. 4, 2013

Related U.S. Application Data

(60) Provisional application No. 61/384,547, filed on Sep. 20, 2010.

(51) Int. Cl.
*H04B 7/04* (2006.01)
*H04B 7/06* (2006.01)

(52) U.S. Cl.
CPC ............ *H04B 7/0452* (2013.01); *H04B 7/0408* (2013.01); *H04B 7/0491* (2013.01); *H04B 7/0632* (2013.01); *H04B 7/0684* (2013.01)

(58) Field of Classification Search
USPC ......... 370/310, 312, 328–329, 336–338, 252; 375/224, 227, 267, 295, 316, 340, 375/345–349; 455/273, 63.7, 422.1, 450, 455/452.1, 501, 509
See application file for complete search history.

(56) References Cited

U.S. PATENT DOCUMENTS

| | | | | |
|---|---|---|---|---|
| 7,974,302 B2 * | 7/2011 | Han | ...................... | H04L 12/413 370/445 |
| 8,724,546 B2 * | 5/2014 | Zhang | .................. | H04B 7/0669 370/328 |
| 2005/0089057 A1 | 4/2005 | Kang et al. | | |
| 2006/0034217 A1 * | 2/2006 | Kwon | .................. | H04W 40/248 370/328 |
| 2006/0153152 A1 * | 7/2006 | Kondylis | .......... | H04W 74/0816 370/338 |
| 2006/0209772 A1 * | 9/2006 | Fang | ..................... | H04W 84/20 370/338 |
| 2009/0103501 A1 * | 4/2009 | Farrag | .................. | H04W 74/02 370/337 |

(Continued)

FOREIGN PATENT DOCUMENTS

WO   2009027931   3/2009
WO   2009141761   11/2009

OTHER PUBLICATIONS

International Search Report and Written received for PCT/US2011/024423, mailed Oct. 31, 2011, 10 pages.

(Continued)

*Primary Examiner* — Mohamed Kamara

(57) ABSTRACT

Various embodiments of the invention may modify the techniques used in conventional networks, to achieve techniques that are better suited for networks that use highly directional communications. A novel method is described for determining whether a channel in such a network is idle. In addition, various protocols and formats are disclosed that are intended for such a network.

17 Claims, 7 Drawing Sheets

(56) References Cited

U.S. PATENT DOCUMENTS

| | | | |
|---|---|---|---|
| 2010/0309871 A1* | 12/2010 | Fischer | H04L 5/0023 370/329 |
| 2010/0322219 A1* | 12/2010 | Fischer | H04B 7/0452 370/338 |
| 2011/0019750 A1* | 1/2011 | Ho | H04L 1/1621 375/259 |
| 2011/0158118 A1* | 6/2011 | Chou | H04L 27/2601 370/252 |
| 2011/0268021 A1* | 11/2011 | Trainin et al. | 370/328 |
| 2011/0317630 A1* | 12/2011 | Zhu | H04W 74/0816 370/329 |

OTHER PUBLICATIONS

Gong, et al., "A Directional CSMA/CA Protocol for mmWave Wireless PANs", IEEE WCNC, Apr. 18-21, 2010, Section III, Figs 2, 4, 5, IEEE peer review document.

* cited by examiner

EXTENDED SCHEDULE ELEMENT FORMAT

| ELEMENT ID | LENGTH | ALLOCATION 1 | ALLOCATION 2 | ••• | ALLOCATION n |
|---|---|---|---|---|---|
| 1 | 1 | 15 | 15 | | 15 |

OCTETS:

| ALLOCATION CONTROL | BF CONTROL | SOURCE AID | DEST AID | START | BLOCK DURATION | BLOCK PERIOD | NUMBER OF BLOCKS |
|---|---|---|---|---|---|---|---|
| 2 | 2 | 1 | 1 | 4 | 2 | 2 | 1 |

OCTETS:

| SP TYPE | TID | PSEUDO-STATIC | TRUNCAT-ABLE | EXTEND-ABLE | NC ACTIVE | MULTI-USER | RESERVED |
|---|---|---|---|---|---|---|---|
| 1 | 4 | 1 | 1 | 1 | 1 | 2 | 5 |

BITS:

FIG. 5

| OCTETS | FRAME CONTROL | DURATION | RA | TA | AID1 | ••• | AIDn | DESIRED RSSI | FCS |
|---|---|---|---|---|---|---|---|---|---|
| | 2 | 2 | 6 | 6 | 2 | | 2 | 2 | 4 |

FIG. 7

PROTOCOL FOR MU MIMO OPERATION IN A WIRELESS NETWORK

BACKGROUND

In many wireless networks using channels in the 60 GHz range, line of sight signal paths are the predominant signal paths because the signals are severely attenuated. This makes such networks well-suited for efficient spatial reuse, and are therefore good candidates for multi-user multiple input multiple output (MU MIMO) techniques. However, once beamforming training has been completed, and highly directional links have been established, conventional protocols established for omni-directional communications may be inadequate.

BRIEF DESCRIPTION OF THE DRAWINGS

Some embodiments of the invention may be better understood by referring to the following description and accompanying drawings that are used to illustrate embodiments of the invention. In the drawings:

FIG. 5 shows a format for a network controller to use for communicating with multiple MDs in a MU MIMO network, according to an embodiment of the invention.

FIG. 7 shows a frame format containing a Desired RSSI field, according to an embodiment of the invention.

DETAILED DESCRIPTION

Figure 1:
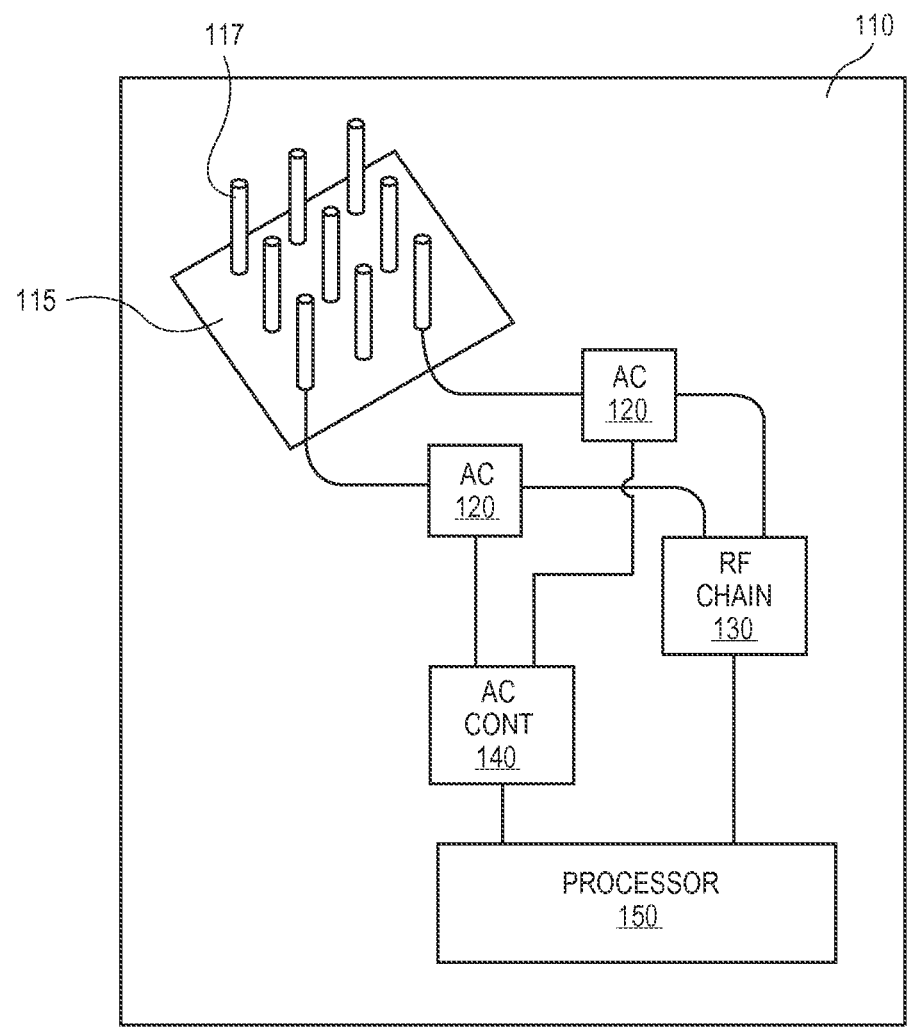
FIG. 1 shows a wireless device with a multi-element antenna and associated electronics, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a tangible non-transient computer-readable medium, which may be read and executed by one or more processors to enable performance of the operations described herein. Such a computer-readable medium may include any tangible non-transient mechanism for storing information in a form readable by one or more computers, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

As used within this document, the term "network controller" is intended to cover devices that schedule and control, at least partially, wireless communications by other devices in the network. A network controller may also be known as a base station (BS), access point (AP), central point (CP), or any other term that may arise to describe the functionality of a network controller.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

In various types of wireless technology, a wireless device with a multi-element antenna may transmit and receive in a directional manner. Although each element may have omni-directional characteristics by itself, by adjusting the phase and amplitude of the signal being transmitted from each element, the combined transmissions may produce an overall signal that is relatively strong in one direction and relatively weak in the other directions. Similarly, by adjusting the phase and amplitude of the signals received by each element, directional reception may be achieved, in which signals from one direction are received relatively strongly and signals received from other directions are received relatively weakly.

A typical network may have multiple devices that communicate with each other, such as a network controller and multiple mobile devices that communicate directly with the network controller. Within this document, the term MU MIMO network (multi-user multiple input multiple output network) indicates a network in which the network controller is capable of simultaneous directional communication with multiple mobile devices in different directions on the same frequency or the same frequencies (simultaneous different spatial channels, where a spatial channel is a directional channel), and in which each of the multiple mobile devices is capable of simultaneous directional communication with the network controller. Within this document, the term MU MIMO RTS means a wireless device is simultaneously transmitting an RTS directionally to each of multiple other devices over different spatial channels. Within this document, the term MU MIMO CTS means a device is simultaneously transmitting or receiving multiple CTSs from different devices over different spatial channels.

Some embodiments of the invention use protocols especially designed for use in a network in which a network controller can simultaneously transmit to (and/or receive from) multiple mobile devices on the same frequency(s) by using directional communications.

FIG. 1 shows a wireless device with a multi-element antenna and associated electronics, according to an embodiment of the invention. In the illustrated device 110, antenna 115 has an array of nine antenna elements 117 arranged in a 3×3 rectangular configuration. Other embodiments may contain other quantities of antenna elements, which may be arranged in other geometric configurations. Each element 117 is connected to a separate analog circuit (AC) 120, which may have adjustable capacitive and/or inductive and/or resistive components that may shift the phase and/or amplitude of the signal going to or from the antenna element. Only two such analog circuits are shown to avoid cluttering up the drawing, but each antenna element may have its own associated analog circuit. The value of, and effect of, these analog components may be individually set by AC Control circuit 140. A single RF chain 130 may be used for the signals going to/from the analog circuits 120 and antenna elements 117. Additional processing unit(s) 150 may provide additional processing as needed.

In most embodiments, the same antenna 115 will be used for both transmission and reception, but other embodiments may have a separate antenna for each. In some embodiments that have the same antenna 115 for transmission and reception, there may one set of analog circuits 120 for transmission and another set for reception. In some embodiments, a device 110 may have multiple antennas, with each antenna having a multi-element array with its own RF chain and set of analog circuits.

Figure 2:
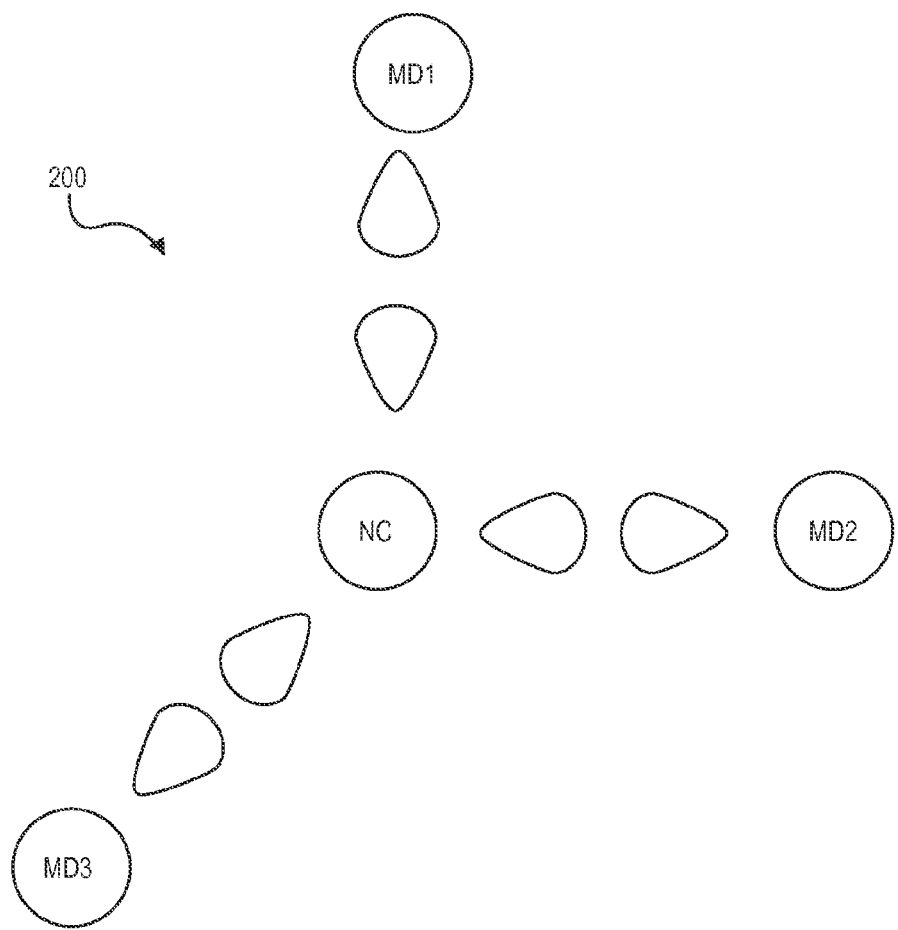
FIG. 2 shows a MU MIMO wireless network, according to an embodiment of the invention.

FIG. 2 shows a MU MIMO wireless network, according to an embodiment of the invention. In the illustrated network 200, a network controller NC may control communications by each of three mobile devices MD1, MD2, and MD3. Each of mobile devices MD1, MD2, and MD3 is assumed to have at least one multi-element antenna and therefore be able to transmit directionally and to receive directionally in at least one direction that is controllable by the device. Network controller NC is assumed to have multiple antennas, each antenna being multi-element, and the NC may be able to simultaneously transmit and/or receive different signals with each antenna at the same frequency(s) in a different direction, each direction being controllable by the device.

The cone-shaped figures next to each device indicate that the device is generally able to communicate directionally within the arc of the cone and not able to do so outside the arc of the cone. Of course, the transition between able to communicate and not able to do so is not a distinct transition, and the location of that transition may vary depending on various factors. So the angular size of each cone in the drawing is symbolic rather than an accurate depiction of measured directionality.

Since the NC is shown communicating with three different MD's simultaneously, it must have at least three antennas, but it may have more. In general, a MU MIMO device may simultaneously transmit (or receive) in as many different directions as it has multi-element antennas, provided the primary lobes (and any secondary lobes if they exist), do not overlap enough to cause the signals from different antennas to interfere with each other.

In networks that use omni-directional transmission and reception techniques, direct combined channel assessment (CCA) may typically be used to determine if a channel is busy before a device tries to transmit on that channel. The device may monitor the channel directly for energy level and/or a decodable signal to determine if another device is already using the channel. However, in an area that contains a mixture of directional and omni-directional signals, this technique may not work well, as a particular device may not hear another device's directional transmission, but may still be able to interfere with that other device's communications if a transmission is attempted. In such networks, virtual carrier sensing may be used instead of direct carrier sensing.

In some embodiments, a 'channel' may be a single-carrier channel (e.g., as used in WiFi), while in other embodiments a channel may be a multi-carrier channel (e.g., using OFDM or OFDMA). This may apply to both omnidirectional and directional (spatial) channels.

Virtual Carrier Sensing

Figure 3:
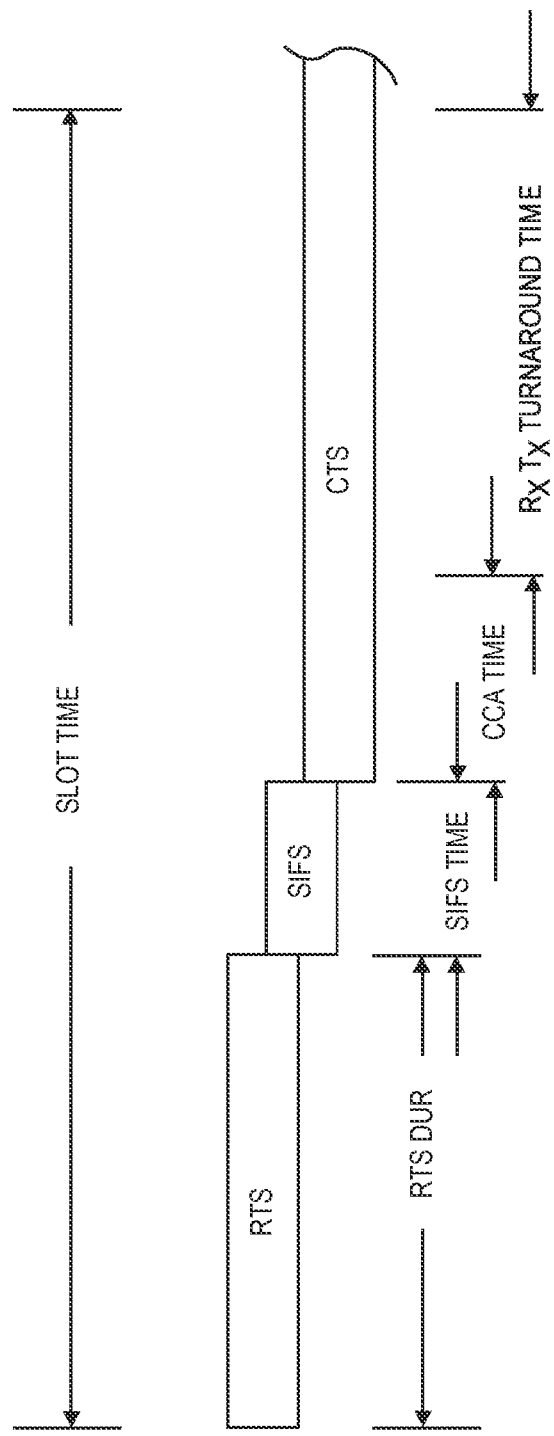
FIG. 3 shows a diagram of a slot time for virtual carrier sensing, according to an embodiment of the invention.

FIG. 3 shows a diagram of a slot time for virtual carrier sensing, according to an embodiment of the invention. In virtual carrier sensing, RTS and CTS frame exchange may be utilized to indicate to MD's whether a channel is busy or idle. That is different than direct carrier sensing, in which the channel is sensed directly to determine if it is idle. As used herein, the term 'slot time' indicates how long a device should wait before determining whether the carrier is idle or not.

In some embodiments, slot time may be set to equal the sum of RTSDur (time to transmit an RTS)+SIFSTime (the time of a short interframe space, which is typically defined in a wireless communications standard)+CCATime (the time for a device to directly sense if a carrier is detected)+RxTx-TurnAroundTime (the time allowed for devices to switch from receive operation to transmit operation). If the channel is sensed as busy during any part of the slot time, it may be assumed to be busy for the entire slot time, and the device may need to defer until a subsequent slot time to determine if the channel is idle at that time.

On the other hand, if the channel is sensed as idle during the entire slot time, the sensing device may decrement its backoff counter by one. 'Idle', in this case, means that current transmissions at that frequency(s) from other devices should not cause interference with a communication by this device, and this device should not cause interference with those other devices' current communications. It does not necessarily mean those other devices are not transmitting at the same frequency. But if they are, the detected signal is weak enough to prevent inter-device interference from occurring.

A device monitoring the medium may be able to detect a quasi-omni RTS or a quasi-omni CTS transmitted from the NC. By monitoring the medium for an entire slot time and by decoding the received RTS or CTS frame, the monitoring device may assure that 1) no other device will transmit a directional RTS that would establish a potentially interfering communication, and 2) no other device will respond to an RTS with a directional CTS that would establish a potentially interfering communication.

After sensing the channel to be idle for an entire slot time, in some embodiments the monitoring device may wait for an additional time period before actually transmitting. This additional time period may be a randomly-selected 'backoff window'. If no transmission is sensed during the slot time, the device may decrement the backoff counter by one, and the device may begin transmitting when the backoff counter reaches zero. Backoff windows are frequently used in contention-based communications to prevent multiple devices from using the same algorithm to determine when the channel is idle, and then all trying to transmit at once.

Downlink Protocol

Figure 4:
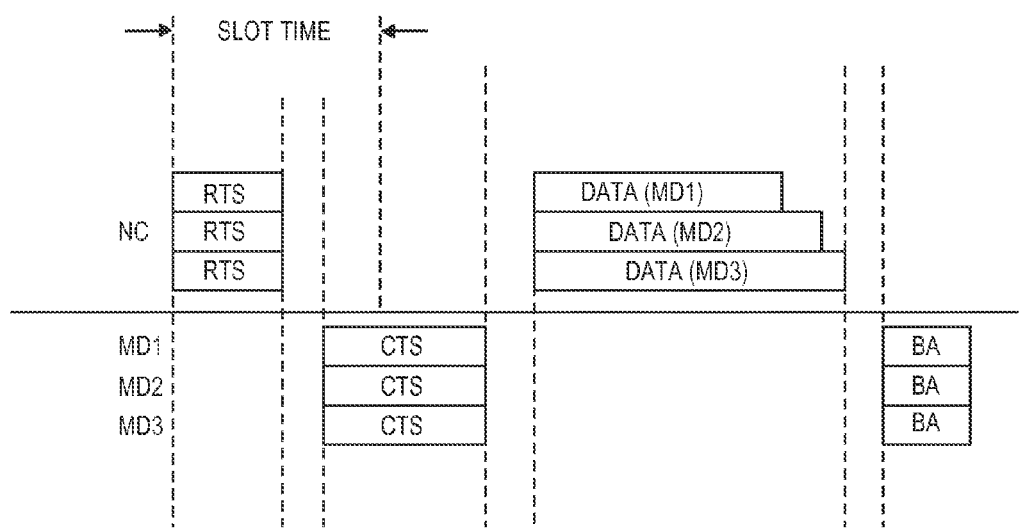
FIG. 4 shows a protocol for a network controller to use for initiating a period of downlink communication with multiple mobile devices, according to an embodiment of the invention.

FIG. 4 shows a protocol for a network controller to use for initiating a period of downlink communication with multiple mobile devices, according to an embodiment of the invention. Once the NC has obtained control of the channel for a transmission, it may use a protocol such as the illustrated example to simultaneously and directionally transmit a separately-addressed RTS (e.g., each with a different unicast address) to each of the multiple MDs. Alternately, the NC may simultaneously and directionally transmit the same RTS (e.g., with the same multi-cast address that each MD recognizes) to each of the multiple MDs. In either case, if uplink MU MIMO is supported, the indicated MDs may each respond simultaneously with a separate CTS. Since communications between the NC and each MD is directional, these simultaneous transmissions should not interfere with each other. If uplink MU MIMO is not supported, the NC may transmit one quasi-omni RTS frame that indicates the MDs to which the pending downlink MU MIMO data transmission is to be directed, and the RTS frame may be addressed to one of the intended destination. Upon receiving a CTS frame from one of the destinations, the NC may transmit the pending downlink MU MIMO transmission to all intended destinations.

After a reserved period of communications has been established in this manner between the NC and each of the MDs, the NC may directionally transmit data to the MDs, each of which may then respond with a block acknowledgement (BA). In some embodiments, the various data transmissions from the NC may be padded as needed to make sure each simultaneous transmission has the same length, thus positioning the multiple BAs for simultaneous transmission. If uplink MU MIMO is supported, BAs may be transmitted simultaneously. If uplink MU MIMO is not supported, the first BA response may be transmitted by one of the destination MDs and the NC may poll the rest of the destination MDs using Block Request frames to trigger those responses.

In the protocol of FIG. 4, because each of the three communications pairs (NC-MD1, NC-MD2, and NC-MD3) has established its spatial channel with a directional RTS and a directional CTS, any signals that would otherwise be interfering should not interfere with each other.

Extended Schedule IE Format

FIG. 5 shows a format for a network controller to use for communicating with multiple MDs in a MU MIMO network, according to an embodiment of the invention. By using this format, the NC may schedule directional communications for each of the multiple MDs. The protocol in FIG. 5 may be used in a downlink transmission from the NC to schedule subsequent communications with multiple MDs. The subsequent communications thus defined may be either downlink or uplink, as described later. The illustrated protocol uses an Information Element (IE), the first two fields of which have been standardized in the industry. This particular IE is labeled an Extended Schedule Element, but other labels may be used. Such an IE may be encapsulated in any feasible larger format. In some embodiments, in may be encapsulated in an RTS and/or a CTS.

In the illustrated IE, shown in the first row of FIG. 5, the first field indicates the Element ID (indicating the purpose and associated layout of the IE), and the second field indicates the length of the IE, so that the receiving device will be able to know where this IE ends and the subsequent fields begin. The remaining fields shown for the IE may be specific to this particular type of IE, and individual implementations may vary somewhat from that shown.

Following the Element ID and Length fields, the rest of the IE is shown to contain multiple Allocation fields, each one of which contains information for a different MD that the NC is to communicate with. Each Allocation field is shown to contain 15 octets, or bytes, but other embodiments may differ. In some embodiments, each Allocation field in the Extended Schedule Element may allocate the same Service Period (SP), i.e., the scheduled period of time.

The second row of FIG. 5 shows the contents of each Allocation field, according to a particular embodiment. In the illustrated embodiment, the first sub-field may indicate Allocation Control, which will be described later in more detail. The second sub-field is shown as BF Control, and may contain information relating to beam-forming for directional control. The next two sub-fields are shown as Source Address ID and Destination Address ID, respectively, to define the source-destination devices for which this allocation is being defined. The remaining sub-fields shown here all have to do with the particular time period being reserved by the Allocation, and in some embodiments may be the same for all allocations in this IE.

Returning to the Allocation Control sub-field, the contents of this embodiment are shown in the bottom row of FIG. 5. Various formats may be used, but in this example, the first sub-field may indicate the type of service period (SP) being reserved for the subsequent communication. In a related manner, the Multi-User sub-field may indicate whether this allocation is for a single-user or multi-user communication. Since two bits provides for four combinations, this sub-field may also be used to indicate whether this is for a downlink or uplink communication. In some embodiments, one bit will indicate single or multi-user, while a separate bit will indicate uplink or downlink. If multi-user is indicated, the previously described Source Address ID may indicate the Group ID of the MU MIMO group, rather than the Source Address ID of an individual device.

The remainder of the sub-fields may be used for various purposes, which are not further described here.

If the number of MDs exceeds the number that the NC can communicate with simultaneously, or if the direction of each MD from the NC makes simultaneous communication unfeasible, the NC may create multiple groups of MDs, and communicate with each group at different times. For example, if seven MDs are located too close together to create seven separate spatial channels, the NC may transmit simultaneously to three MDs in a first group, simultaneously receive the acknowledgements from those three, then simultaneously transmit to four more MDs in a second group and simultaneously receive the acknowledgements from those four.

Uplink Protocol

Figure 6:
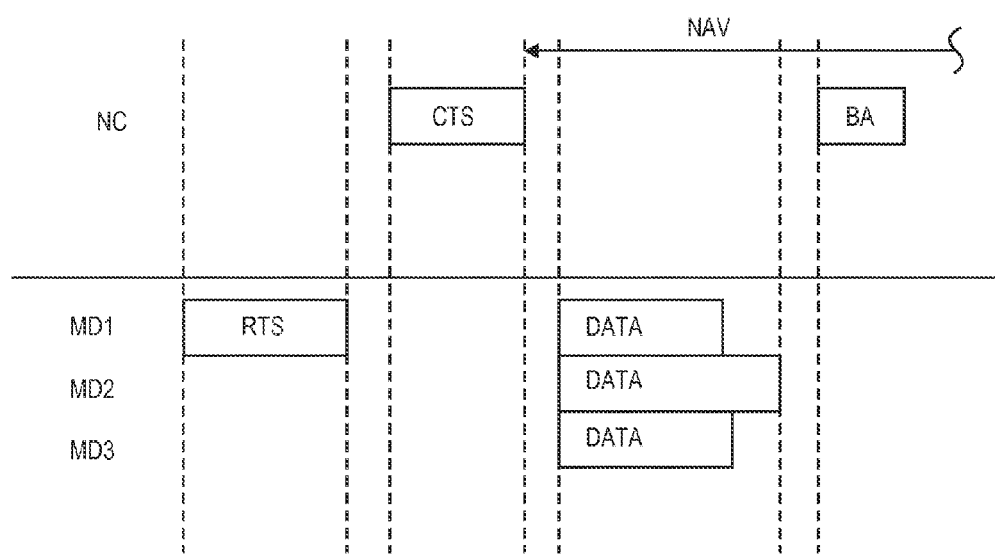
FIG. 6 shows a protocol for a network controller to use for initiating a period of uplink communication with multiple mobile devices, according to an embodiment of the invention.

FIG. 6 shows a protocol for a network controller to use for initiating a period of uplink communication with multiple mobile devices, according to an embodiment of the invention. In this example, MD1 obtains control of the medium and transmits an RTS to request time for an uplink transmission. The NC then uses the opportunity to permit multiple MDs (in this case, MD1, MD2, MD3) to make simultaneous uplink transmissions. The NC may do so by transmitting a CTS that accomplishes two things: 1) it identifies the multiple MDs (including MD1) that may transmit simultaneously, and 2) it specifies a desired RSSI (received signal strength indicator) for each MD to use for its transmission. The indicated RSSIs may be chosen to make the various uplink transmissions more likely to be received correctly. For example, similar RSSIs may reduce the chance that the signal on one spatial channel from one direction will be sufficiently strong to cause interference on another spatial channel from another direction. Alternately, overlapping signals from a competing network may need to be overcome with a stronger RSSI. Transmission power levels may have previously been established in each MD to achieve a particular RSSI at the NC.

After receiving the CTS, each indicated MD which has uplink data to send may then directionally transmit that data at the same time. The NC may then transmit directional Block Acknowledgements to the MDs to acknowledge receipt of the data. In some embodiments, the data transmissions may be padded so that they end at the same time. In some embodiments, the CTS may establish a network allocation vector (NAV) for other network devices so that they will not cause interference by transmitting during the reserved time period. Such 'other' devices may include 1) devices that are not addressed by the CTS but are able to receive and decode it, and/or 2) devices that are addressed by the CTS but do not transmit data during the reserved time period.

Uplink Format

FIG. 7 shows a frame format containing a Desired RSSI field, according to an embodiment of the invention. In some embodiments, this may be a CTS frame, while in other embodiments, the relevant parts may be contained in another type of frame. In the illustrated example, the first field may be a Frame Control field, so that the receiver can determine what kind of frame this is. The second field is shown as a Duration field, so the receiver may know where this frame ends and the next frame begins. Receive Address (RA) and Transmit Address (TA) indicate the intended receiver and the transmitter of this frame. In some embodiments, the RA may be a multicast address indicating multiple MDs are all the intended recipients of the CTS, but it is possible that not all of the recipients will be scheduled to transmit. Following this are multiple AID fields, each indicating a particular MD that is scheduled to simultaneously make an uplink transmission.

The Desired RSSI may indicate a received signal strength (as measured at the NC) that each MD should try to achieve with its transmission. This RSSI may be applied to each MD indicated by the AID fields. As described previously, the transmit signal power associated with various RSSI values may have been previously established between each MD and the NC. The FCS field may be used as a validation field to determine that the frame was received correctly.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
communicating, in a wireless network using multi-user multiple input multiple output (MU MIMO) communications, a portion of data comprising an element ID field, a length field, and multiple allocation fields (AF), each AF containing information indicating an identification of a different particular mobile device in the network, each AF further containing information about subsequent simultaneous communications with the identified mobile device, and
each AF comprising an allocation control field comprising at least one sub-field, a first sub-field of the at least one sub-field including the information about the subsequent simultaneous communications, the information to indicate whether the subsequent simultaneous communications are to be single user or multi-user communication and whether the subsequent simultaneous communications are to be an uplink or downlink communications; and
performing the subsequent simultaneous communications with the identified mobile device in accordance with the information.

2. The method of claim 1, the first sub-field comprising a first bit to indicate whether the subsequent simultaneous communications are to be single user or multi-user and a second bit to indicate whether the subsequent simultaneous communications are to be an uplink or downlink communications.

3. The method of claim 1, the portion of data comprising an information element.

4. An apparatus, comprising a wireless communications device comprising a processor, memory, and radio for:
communicating, in a wireless network using multi-user multiple input multiple output (MU MIMO) communications, a portion of data comprising an element ID field, a length field, and multiple allocation fields (AF), each AF containing information indicating an identification of a different particular mobile device in the network, each AF further containing information about subsequent simultaneous communications with the identified mobile device, and each AF comprising an allocation control field comprising at least one sub-field, a first sub-field of the at least one sub-field including the information about the subsequent simultaneous communications, the information to indicate whether the subsequent simultaneous communications are to be single user or multi-user communication and whether the subsequent simultaneous communications are to be an uplink or downlink communications; and
performing the subsequent simultaneous communications with the identified mobile device in accordance with the information.

5. The apparatus of claim 4, the first sub-field comprising a first bit to indicate whether the subsequent simultaneous communications are to be single user or multi-user and a second bit to indicate whether the subsequent simultaneous communications are to be an uplink or downlink communications.

6. The apparatus of claim 4, the portion of data comprising an information element.

7. The apparatus of claim 4, the wireless communication device comprising a network controller.

8. The apparatus of claim 4, the wireless communication device comprising a mobile device.

9. A non-transitory computer-readable storage medium comprising instructions, which when executed by one or more processors result in performing operations comprising:

communicating, in a wireless network using multi-user multiple input multiple output (MU MIMO) communications, a portion of data comprising an element ID field, a length field, and multiple allocation fields (AF), each AF containing information indicating an identification of a different particular mobile device in the network, each AF further containing information about subsequent simultaneous communications with the identified mobile device, and each AF comprising an allocation control field comprising at least one sub-field, a first sub-field of the at least one sub-field including the information about the subsequent simultaneous communications, the information to indicate whether the subsequent simultaneous communications are to be single user or multi-user communication and whether the subsequent simultaneous communications are to be an uplink or downlink communications; and performing the subsequent simultaneous communications with the identified mobile device in accordance with the information.

10. The computer-readable storage medium of claim 9, the first sub-field comprising a first bit to indicate whether the subsequent simultaneous communications are to be single user or multi-user and a second bit to indicate whether the subsequent simultaneous communications are to be an uplink or downlink communications.

11. The non-transitory computer-readable storage medium of claim 9, the portion of data comprising an information element.

12. The method of claim 1, the portion of data encapsulated in a request-to-send (RTS) or a clear-to-send (CTS).

13. The method of claim 1, the one or more sub-fields comprising a second sub-field to indicate a type of service period (SP) being reserved for the subsequent communications and each AF to allocate a same SP for each of the identified mobile devices.

14. The apparatus of claim 4, the portion of data encapsulated in a request-to-send (RTS) or a clear-to-send (CTS).

15. The apparatus of claim 4, the one or more sub-fields comprising a second sub-field to indicate a type of service period (SP) being reserved for the subsequent communications and each AF to allocate a same SP for each of the identified mobile devices.

16. The computer-readable storage medium of claim 9, the portion of data encapsulated in a request-to-send (RTS) or a clear-to-send (CTS).

17. The computer-readable storage medium of claim 9, the one or more sub-fields comprising a second sub-field to indicate a type of service period (SP) being reserved for the subsequent communications and each AF to allocate a same SP for each of the identified mobile devices.

* * * * *